United States Patent
Burckart et al.

(10) Patent No.: US 8,930,457 B2
(45) Date of Patent: *Jan. 6, 2015

(54) PROXIMITY INITIATED CO-BROWSING SESSIONS

(75) Inventors: Erik J. Burckart, Raleigh, NC (US); Andrew J. Ivory, Wake Forest, NC (US); Aaron K. Shook, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/526,652

(22) Filed: Jun. 19, 2012

(65) Prior Publication Data
US 2013/0339535 A1    Dec. 19, 2013

(51) Int. Cl.
| G06F 15/16 | (2006.01) |
| H04L 12/18 | (2006.01) |
| H04L 29/06 | (2006.01) |
| H04N 21/81 | (2011.01) |

(52) U.S. Cl.
CPC ........ *H04L 12/1822* (2013.01); *H04L 65/1066* (2013.01); *H04L 65/1069* (2013.01); *H04N 21/8173* (2013.01); *H04L 12/1813* (2013.01)
USPC ............................ 709/204; 709/206; 709/207

(58) Field of Classification Search
CPC ............ H04L 12/1822; H04L 12/1813; H04L 65/1066; H04L 65/1069; H04N 21/8173
USPC ........ 709/204, 205, 206, 207, 227; 705/7.13; 715/751, 753, 716; 700/94; 345/173; 455/550.1, 420
See application file for complete search history.

(56) References Cited

U.S. PATENT DOCUMENTS

| 8,015,496 | B1 * | 9/2011 | Rogers .......................... 715/751 |
| 2003/0073432 | A1 * | 4/2003 | Meade, II ...................... 455/420 |
| 2003/0208603 | A1 * | 11/2003 | Manor et al. .................. 709/227 |
| 2009/0019367 | A1 * | 1/2009 | Cavagnari et al. ............ 715/716 |
| 2009/0088197 | A1 * | 4/2009 | Stewart ..................... 455/550.1 |
| 2009/0309846 | A1 * | 12/2009 | Trachtenberg et al. ........ 345/173 |
| 2011/0161835 | A1 * | 6/2011 | Karam .......................... 715/753 |
| 2011/0202156 | A1 * | 8/2011 | Glitsch et al. ................... 700/94 |
| 2011/0275358 | A1 | 11/2011 | Faenger |
| 2012/0054640 | A1 * | 3/2012 | Nancke-Krogh ............. 715/751 |
| 2012/0150578 | A1 * | 6/2012 | Mangat et al. ............... 705/7.13 |
| 2012/0150963 | A1 * | 6/2012 | Horowitz et al. ............. 709/205 |

OTHER PUBLICATIONS

"Bump (application)", downloaded Jun. 13, 2012, http://en.wikipedia.org/wiki/Bump.
Kyungwhan Park et al., "Smartphone Remote Lock and Wipe System with Integrity Checking of SMS Notification", Consumer Electronics (ICCE) 2011 IEEE International Conference, Jan. 9, 2011,pp. 263-264, IEEE International Conference, Las Vegas, NV, US.

(Continued)

*Primary Examiner* — Le H Luu
(74) *Attorney, Agent, or Firm* — Jordan IP Law, LLC (57) ABSTRACT

Methods and systems of conducting co-browsing sessions may provide for detecting a proximity event between a first device and a second device, and initiating a co-browsing session between the first device and the second device based on the proximity event. In one example, the proximity event is a physical bump between the first and second devices.

23 Claims, 4 Drawing Sheets

(56) References Cited

OTHER PUBLICATIONS

Emile Petrone, "Server iOS Push API", UrbanAirship.com, Jun. 19, 2012, https://docs.urbanairship.com/display/DOCS/Server%3A+iOS+Push+API.

"Frequently Asked Questions: The Bump App for iPhone and Android", bu.mp/company/faq, downloaded Jun. 14, 2012.

Danielscaleb0, "A device to device push notification system", Stackoverflow.com, May 4, 2011, http://stackoverflow.com/questions/5891027/a-device-to-device-push-notification-system.

* cited by examiner

PROXIMITY INITIATED CO-BROWSING SESSIONS

BACKGROUND

Embodiments of the present invention generally relate to co-browsing sessions. More particularly, embodiments relate to the use of physical bumps between handheld devices to initiate co-browsing sessions.

If someone viewing a web page on a handheld device is interested in sharing that web page with another person, the person sharing the web page may be limited to either handing the device to the other person or sending the other person a link to the web page. Handing the device to the other person, however, can raise security concerns because the other person could gain access to other sensitive data and/or applications on the device. Moreover, if the person sharing the web page wishes to share multiple pages (e.g., a particular browsing sequence), both alternatives can be time consuming and inconvenient to the individuals involved. While certain screen sharing solutions may permit the display output of one device to be viewed on another device, there remains considerable room for improvement. For example, the establishment of conventional screen sharing sessions can be complicated and time consuming. Additionally, if the person sharing the display output switches to a view having sensitive content (e.g., personal email), that content may also be displayed on the device of the other person, which can also raise security concerns.

BRIEF SUMMARY

Embodiments may include a computer program product having a computer readable storage medium and computer usable code stored on the computer readable storage medium. If executed by a processor, the computer usable code may cause a first device to detect one or more proximity events between the first device and a second device, and initiate a co-browsing session between the first device and the second device based on the proximity event.

Embodiments may include a computer program product having a computer readable storage medium and computer usable code stored on the computer readable storage medium. If executed by a processor, the computer usable code may cause a first device to detect one or more proximity events between the first device and a plurality of second devices, and initiate a co-browsing session between the first device and the plurality of second devices based on the one or more proximity events.

Embodiments may include a computer program product having a computer readable storage medium and computer usable code stored on the computer readable storage medium. If executed by a processor, the computer usable code may cause a first device to detect a proximity event between the first device and a second device, prompt a user for authorization to initiate a co-browsing session in response to the proximity event, and connect a local browser on the first device to a central proxy server if an affirmative response to the prompt is received to initiate the co-browsing session. The computer usable code, if executed, can also cause the first device to determine that the local browser has been placed in a background mode, receive one or more co-browsing updates originating from the second device, and apply at least one of the one or more co-browsing updates originating from the second device to the local browser while the local browser is in the background mode.

Embodiments may include a computer program product having a computer readable storage medium and computer usable code stored on the computer readable storage medium. If executed by a processor, the computer usable code may cause a first device to detect one or more proximity events between the first device and a plurality of second devices, and connect a local browser on the first device to a central proxy server to initiate a co-browsing session between the first device and the plurality of second devices based on the one or more proximity events. The computer usable code, if executed, may also cause the first device to identify one or more co-browsing updates originating from the first device, and transmit at least one of the one or more co-browsing updates originating from the first device to the central proxy server. Moreover, the computer usable code, if executed, can cause the first device to determine that the local browser on the first device has been placed in a background mode, receive one or more co-browsing updates originating from one or more of the plurality of second devices, and apply at least one of the one or more co-browsing updates to the local browser while the local browser is in the background mode.

Embodiments may also include a computer implemented method that provides for detecting a proximity event between a first device and a second device, and initiating a co-browsing session between the first device and the second device based on the proximity event.

Embodiments may also include a computer implemented method that provides for detecting one or more proximity events between a first device and a plurality of second devices, and initiating a co-browsing session between the first device and the plurality of second devices based on the one or more proximity events.

Embodiments may also include a computer implemented method that provides for detecting a proximity event between a first device and a second device, prompting a user for authorization to initiate a co-browsing session in response to the proximity event, and connecting a local browser on the first device to a central proxy server if an affirmative response to the prompting is received to initiate the co-browsing session. In addition, the method can involve determining that the local browser has been placed in a background mode, receiving one or more co-browsing updates originating from the second device, and applying at least one of the one or more co-browsing updates originating from the second device to the local browser while the local browser is in the background mode.

Embodiments may also include a computer implemented method that provides for detecting one or more proximity events between a first device and a plurality of second devices, connecting a local browser on the first device to a central proxy server to initiate a co-browsing session between the first device and the plurality of second devices based on the one or more proximity events, identifying one or more co-browsing updates originating from the first device, and transmitting at least one of the one or more co-browsing updates originating from the first device to the central proxy server. In addition, the method can involve determining that the local browser on the first device has been placed in a background mode, receiving one or more co-browsing updates originating from one or more of the plurality of second devices, and applying at least one of the one or more co-browsing updates to the local browser while the local browser is in the background mode.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
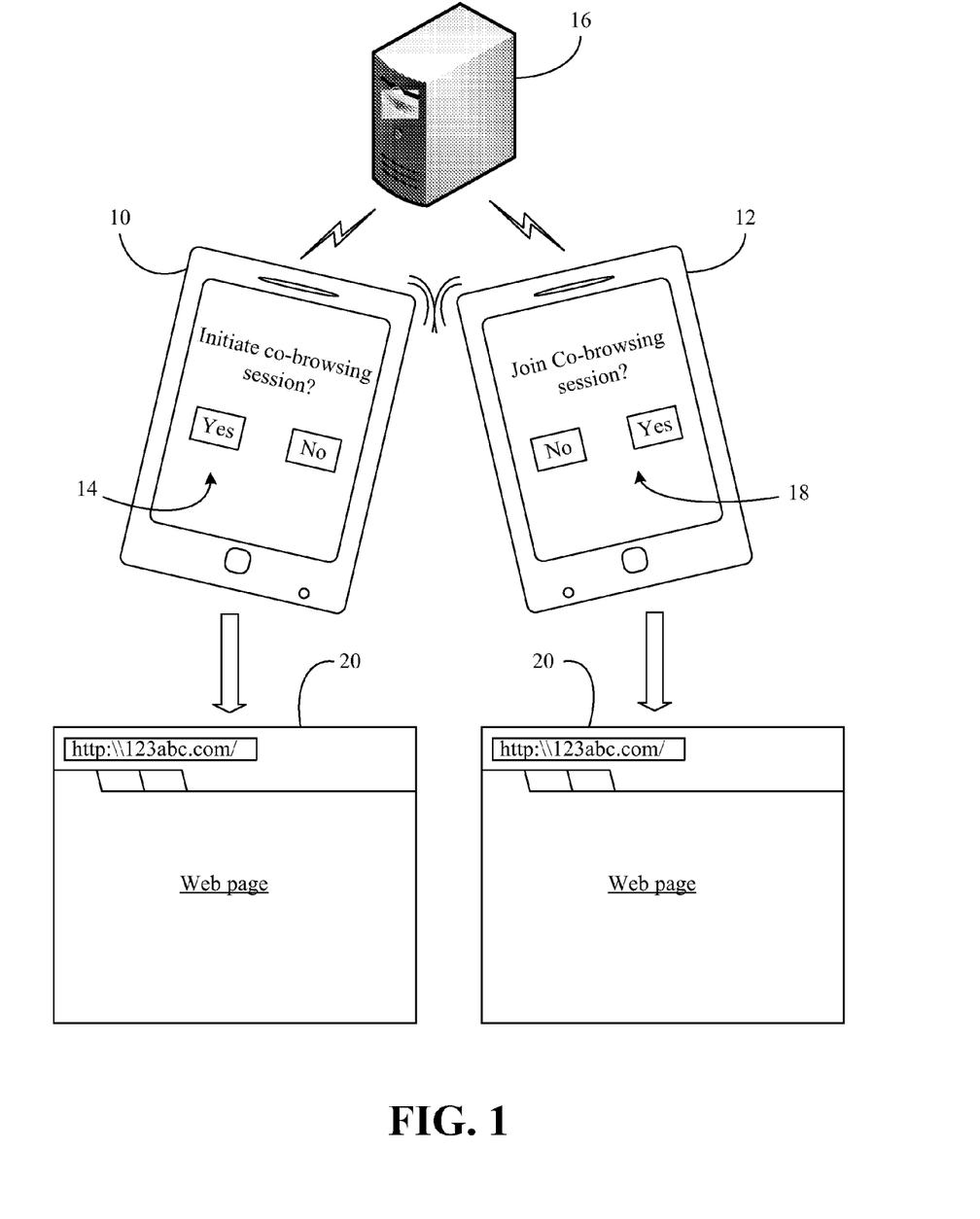
FIG. 1 is a block diagram of an example of a proximity event initiated co-browsing session between handheld devices according to an embodiment.

Referring now to FIG. 1, an initiation of a co-browsing session between a first device 10 and a second device 12 is shown. In the illustrated example, the devices 10, 12 are physically bumped together by their respective users, which triggers an authorization prompt 14 ("Initiate co-browsing session?") on the display of the first device 10. If an affirmative response to the prompt 14 is received, the first device 10 may connect a local browser on the first device 10 to a central proxy server 16 in order to initiate the co-browsing session. The central proxy server 16 may in turn notify the second device 12 of the co-browsing session, wherein the second device 12 can also present an authorization prompt 18 on the display of the second device 12. If an affirmative response to the authorization prompt 18 is received by the second device 12, both devices 10, 12 may be configured to display a common web page 20 to their respective users. Moreover, as the central proxy server 16 generates different web pages for the co-browsing session due to web browsing activity on either device 10, 12, those pages can be delivered to both devices 10, 12 so that their respective users may experience the same page navigation sequence. As will be discussed in greater detail, the co-browsing session can be conducted between more than two devices.

Figure 2:
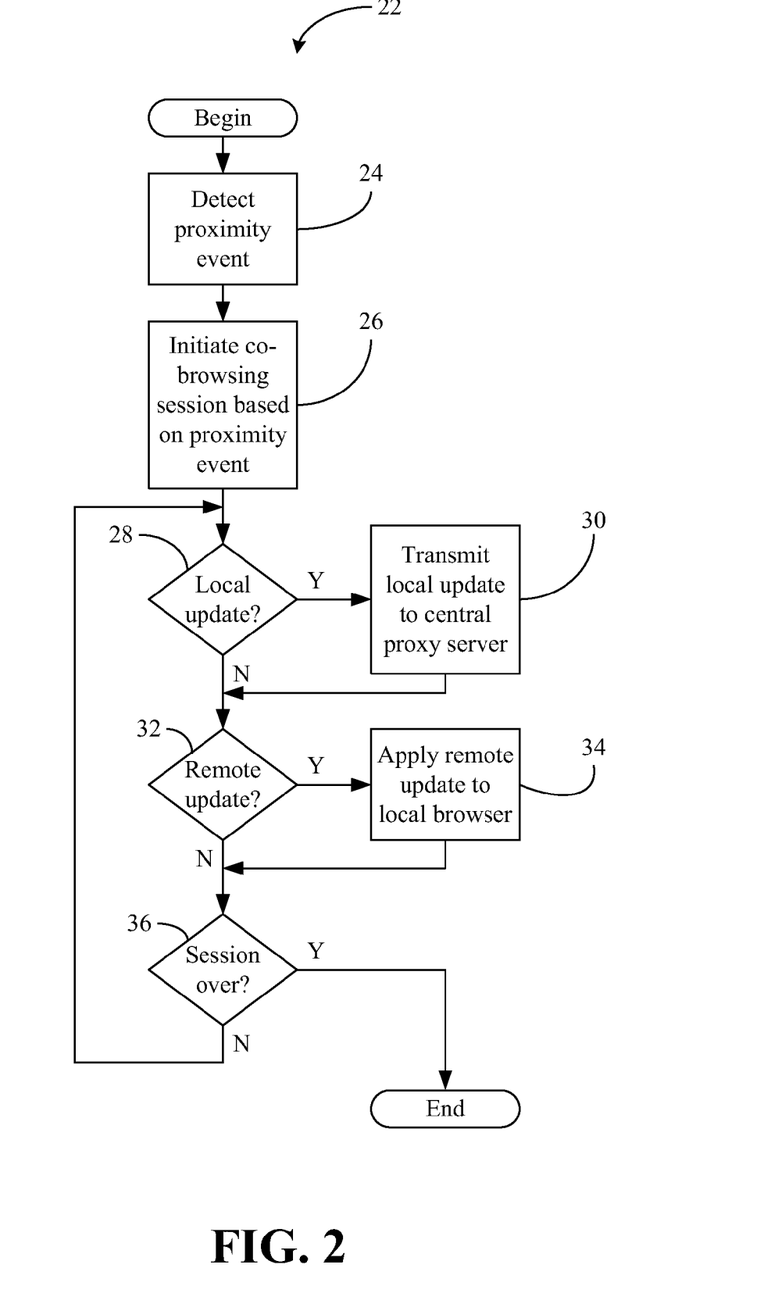
FIG. 2 is a flowchart of an example of a method of conducting a co-browsing session according to an embodiment.

FIG. 2 shows a method 22 of conducting a co-browsing session. The method 22 may be implemented in an application such as, for example, a web browser, wherein the application might be executed on a smart phone, tablet, media player, personal digital assistant (PDA) or other handheld device. Illustrated processing block 24 provides for detecting a proximity event such as a physical bump, Bluetooth connection, RFID (radio frequency identifier) interaction, etc. between two or more devices, wherein a co-browsing session can initiated at block 26 based on the proximity event. The use of physical bumps to initiate co-browsing sessions may be particularly advantageous due to the simplicity and straightforward implementation of such an action. Initiation of the co-browsing session may involve connecting a local browser to a central proxy server, as already discussed. In one example, the local device hashes its own system name concatenated with the current time, and issues the result as a token to the central proxy server and the other devices participating in the co-browsing session, wherein the server may use the tokens to order co-browsing updates and identify the originator of co-browsing updates.

A determination may be made at block 28 as to whether a local update is available due to, for example, the user of the local device requesting a new web page. If so, a co-browsing update (e.g., web request) can be transmitted to the central proxy server at block 30. In such a case, the central proxy server may issue a push notification of the corresponding web page request to each of the other devices participating in the co-browsing session. When the requested page is ready, it may also be delivered to each of the devices participating in the co-browsing session. If more than two devices are participating in the co-browsing session, the update could be transmitted to an ordered queue of the central proxy server, wherein the server may be configured to use the queue to keep track of all requests that are coming in from the participatory devices. Requests can therefore be placed in the back of the queue as they arrive, with duplicate requests being omitted from the queue.

Illustrated block 32 determines whether a remote update (e.g., update originating at another device in the co-browsing session, server response to local update, and so forth) is available. Thus, the determination at block 32 might involve ascertaining whether any push notifications of pending web page requests or new web pages have been received from the central proxy server. If so, the remote update can be applied to the local browser at block 34. As will be discussed in greater detail, the application of the remote update to the local browser may take place even when the browser has been place in a background mode. If it is determined at block 36 that the co-browsing session is not over, the update checks may be repeated.

Figure 3:
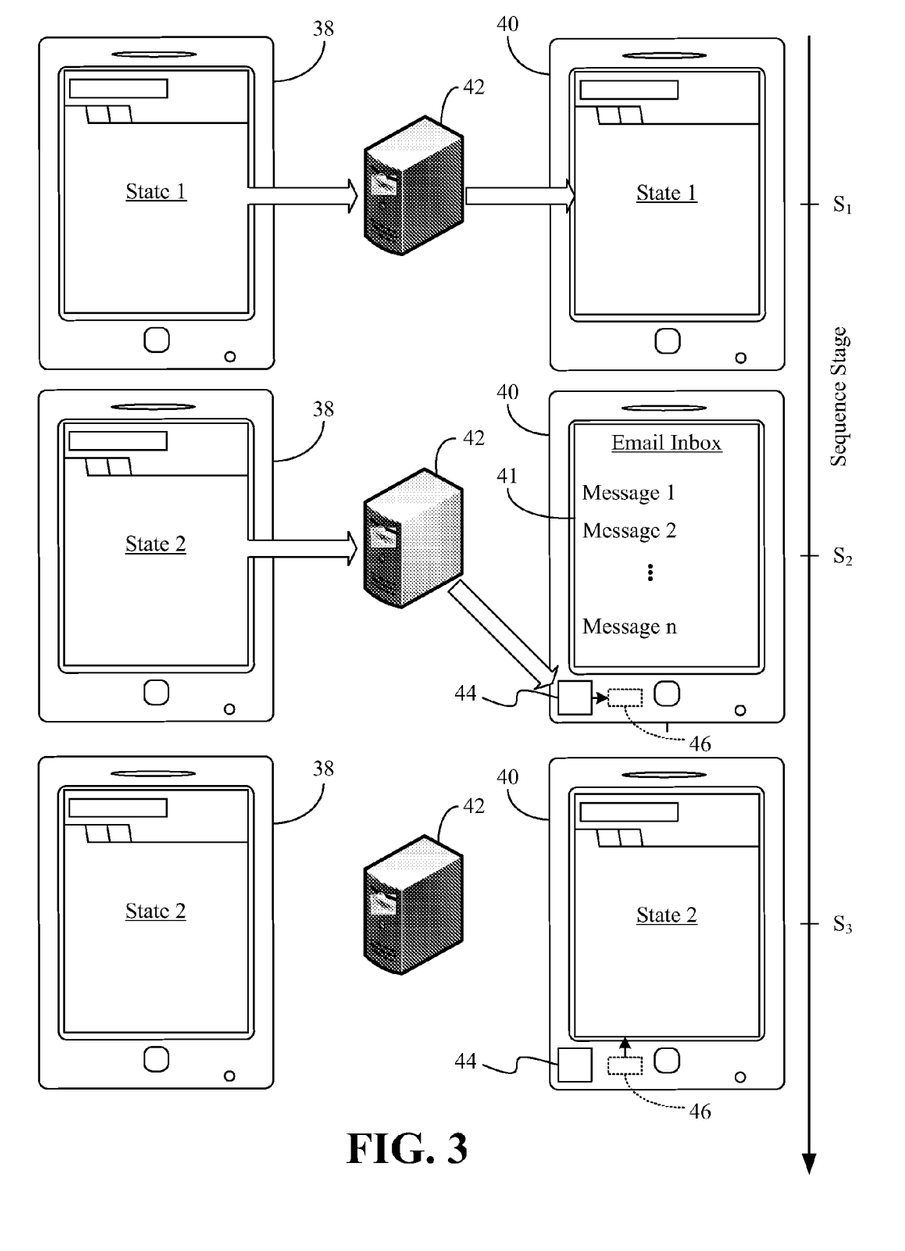
FIG. 3 is a block diagram of an example of a co-browsing update sequence between handheld devices according to an embodiment.

Turning now to FIG. 3, a co-browsing update sequence between two devices is shown. The illustrated sequence may also take place with respect to more than two devices. In the illustrated example, at stage $S_1$ a first device 38 requests a web page from a central proxy server 42 in order to place its browser in a first state ("State 1"). At stage $S_2$ the central proxy server 42 also places the browser of a second device 40 in the first state due to the device 38, 40 being participants in a co-browsing session. The first device 38 may then request another web page from the central proxy server 42 in order to place its browser in a second state ("State 2"). If, however, the browser on the second device 40 has been placed in the background in order to view another application such as, for example, an email inbox application 41, the update can still be applied to the browser of the second device. More particularly, the second device 40 may have a state module 44 that receives the update and stores the update to an appropriate memory location 46 (e.g., state cache) associated with the browser state. Accordingly, when the browser on the second device 40 is returned to the foreground mode at state $S_3$, the browser will be in the same state ("State 2") as that of the first device 38. Of particular note is that the server 42 is not involved at stage $S_3$, in the example shown.

Figure 4:
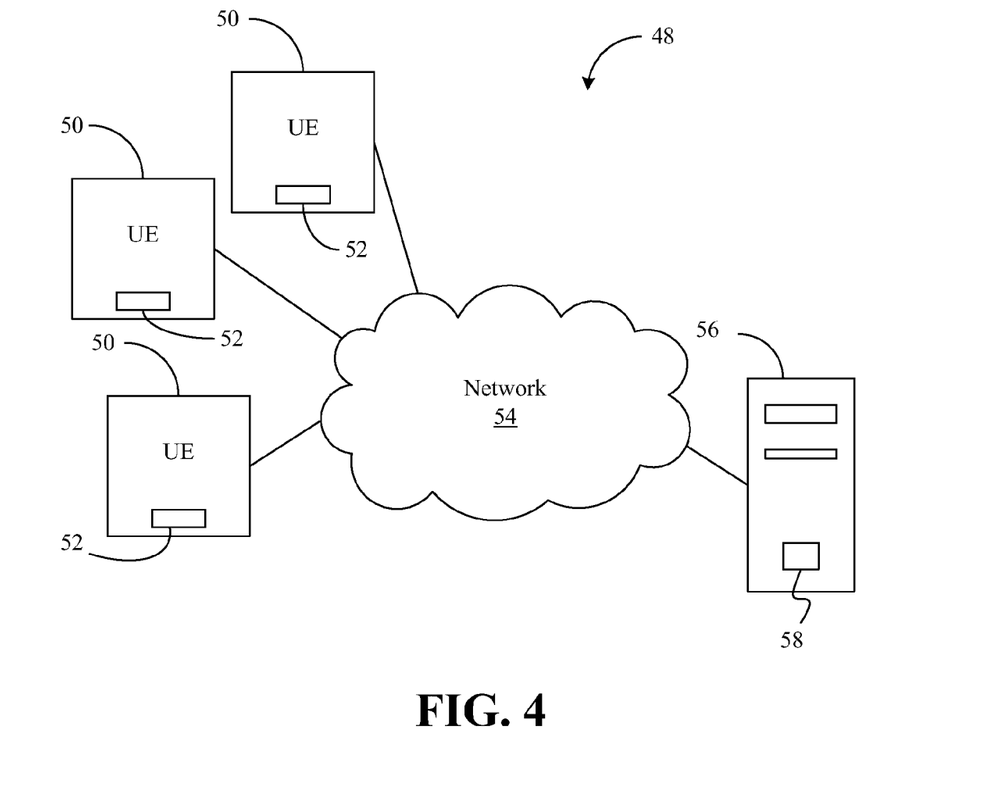
FIG. 4 is a block diagram of a networking architecture according to an embodiment.

FIG. 4 shows a networking architecture 48 in which user equipment (UE) devices 50 include browsers 52 that are configured to detect one or more proximity events between the devices 50 and initiate a co-browsing session between the devices 50 based on the proximity events. The proximity events may include, for example, a physical bump between the devices 50, as already noted. The co-browsing session may be conducted over a network 54 and with respect to a central server 56. In the illustrated example, the server 56 can have stored thereon hypertext markup language (HTML) and other markup language-encoded content, as well as databases and applications such as Java and other applications. The illustrated server 56 also includes an ordered queue 58 to facilitate the tracking of co-browsing updates from the devices 50. The network 54 can itself include any suitable combination of servers, access points, routers, base stations, mobile switching centers, public switching telephone network (PSTN) components, etc., to facilitate communication between the UE devices 50 and the server 56.

Techniques described herein may therefore enable quick and convenient initiation of co-browsing sessions between nearby devices. Moreover, continuing to apply co-browsing updates while the browser is in the background can enable users to switch between applications during a co-browsing session, which may be particularly advantageous in handheld devices having very limited screen space. Additionally, the use of co-browsing sessions can address security concerns by preventing data and/or applications other than the browser from being viewed by other devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:
a non-transitory computer readable storage medium; and
computer usable code stored on the non-transitory computer readable storage medium, where, if executed by a processor, the computer usable code causes a first device to:
detect one or more proximity events between the first device and a plurality of second devices;
connect a local browser on the first device to a central proxy server to initiate a co-browsing session between the first device and the plurality of second devices based on the one or more proximity events;
identify one or more co-browsing updates originating from the first device;
transmit at least one of the one or more co-browsing updates originating from the first device to the central proxy server;
determine that the local browser on the first device has been placed in a background mode;
receive one or more co-browsing updates originating from one or more of the plurality of second devices; and
apply at least one of the one or more co-browsing updates to the local browser while the local browser is in the background mode.

2. The computer program product of claim 1, wherein the one or more co-browsing updates originating from one or more of the plurality of second devices includes one or more of a push notification of a pending web page request and a web page.

3. The computer program product of claim 1, wherein the computer usable code, if executed, causes the first device to prompt a user for authorization to initiate the co-browsing session in response to the proximity event, wherein the co-browsing session is initiated if an affirmative response to the prompt is received.

4. The computer program product of claim 1, wherein the computer usable code, if executed, causes the first device to transmit at least one of the one or more co-browsing updates originating from the first device to an ordered queue of the central proxy server.

5. The computer program product of claim 1, wherein at least one of the one or more proximity events is to include a physical bump between the first device and one or more of the plurality of second devices.

6. A computer program product comprising:
a non-transitory computer readable storage medium; and
computer usable code stored on the non-transitory computer readable storage medium, where, if executed by a processor, the computer usable code causes a first device to:
detect a proximity event between the first device and a second device;
prompt a user for authorization to initiate a co-browsing session in response to the proximity event;
connect a local browser on the first device to a central proxy server if an affirmative response to the prompt is received to initiate the co-browsing session;
determine that the local browser has been placed in a background mode;
receive one or more co-browsing updates originating from the second device; and
apply at least one of the one or more co-browsing updates originating from the second device to the local browser while the local browser is in the background mode.

7. The computer program product of claim 6, wherein at least one of the one or more co-browsing updates originating from the second device includes a push notification of a pending web page request.

8. The computer program product of claim 6, wherein at least one of the one or more co-browsing updates originating from the second device includes a web page.

9. The computer program product of claim 6, wherein the computer usable code, if executed, causes the first device to:
identify one or more co-browsing updates originating from the first device; and
transmit at least one of the one or more co-browsing updates to the central proxy server.

10. The computer program product of claim 6, wherein the proximity event is to include a physical bump between the first and second devices.

11. A computer program product comprising:
a non-transitory computer readable storage medium; and
computer usable code stored on the non-transitory computer readable storage medium, where, if executed by a processor, the computer usable code causes a first device to:
detect one or more proximity events between the first device and a plurality of second devices;
initiate a co-browsing session between the first device and the plurality of second devices based on the one or more proximity events;
determine that a local browser on the first device has been placed in a background mode;
receive one or more co-browsing updates originating from one or more of the plurality of second devices; and
apply at least one of the one or more co-browsing updates to the local browser while the local browser is in the background mode.

12. The computer program product of claim 11, wherein the one or more co-browsing updates originating from one or more of the plurality of second devices includes one or more of a push notification of a pending web page request and a web page.

13. The computer program product of claim 11, wherein the computer usable code, if executed, causes the first device to prompt a user for authorization to initiate the co-browsing session in response to the proximity event, wherein the co-browsing session is initiated if an affirmative response to the prompt is received.

14. The computer program product of claim 11, wherein the computer usable code, if executed, causes the first device to connect a local browser on the first device to a central proxy server to initiate the co-browsing session.

15. The computer program product of claim 14, wherein the computer usable code, if executed, causes the first device to:
identify one or more co-browsing updates originating from the first device; and
transmit at least one of the one or more co-browsing updates to the central proxy server.

16. The computer program product of claim 15, wherein the computer usable code, if executed, causes the first device to transmit at least one of the one or more co-browsing updates to an ordered queue of the central proxy server.

17. The computer program product of claim 11, wherein at least one of the one or more proximity events is to include a physical bump between the first device and one or more of the plurality of second devices.

18. The computer program product of claim 17, wherein the proximity event is to include a physical bump between the first and second devices.

19. A computer program product comprising:
a non-transitory computer readable storage medium; and
computer usable code stored on the non-transitory computer readable storage medium, where, if executed by a processor, the computer usable code causes a first device to:
detect a proximity event between the first device and a second device;
initiate a co-browsing session between the first device and the second device based on the proximity event;
determine that a local browser on the first device has been placed in a background mode;
receive one or more co-browsing updates originating from the second device; and
apply at least one of the one or more co-browsing updates to the local browser while the local browser is in the background mode.

20. The computer program product of claim 19, wherein the one or more co-browsing updates originating from the second device includes one or more of a push notification of a pending web page request and a web page.

21. The computer program product of claim 19, wherein the computer usable code, if executed, causes the first device to prompt a user for authorization to initiate the co-browsing session in response to the proximity event, wherein the co-browsing session is initiated if an affirmative response to the prompt is received.

22. The computer program product of claim 19, wherein the computer usable code, if executed, causes the first device to connect a local browser on the first device to a central proxy server to initiate the co-browsing session.

23. The computer program product of claim 22, wherein the computer usable code, if executed, causes the first device to:
identify one or more co-browsing updates originating from the first device; and
transmit at least one of the one or more co-browsing updates to the central proxy server.

* * * * *